(12) United States Patent
Betts

(10) Patent No.: US 6,668,023 B1
(45) Date of Patent: Dec. 23, 2003

(54) LINEAR BLOCK INTERLEAVER SYSTEM AND METHOD

(75) Inventor: William L. Betts, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/073,103

(22) Filed: May 5, 1998

Related U.S. Application Data

(60) Provisional application No. 60/070,070, filed on Dec. 30, 1997.

(51) Int. Cl.[7] .............................................. H04B 15/00
(52) U.S. Cl. ...................................................... 375/285
(58) Field of Search ................................ 375/211, 219, 375/220, 222, 232, 254, 278, 295, 296, 346; 370/278, 282, 286, 289, 201, 480, 490, 493; 379/93.03, 93.04, 406, 417

(56) References Cited

U.S. PATENT DOCUMENTS

| | | | | |
|---|---|---|---|---|
| 5,602,833 A | * | 2/1997 | Zehavi | 370/209 |
| 5,889,821 A | * | 3/1999 | Arnstein et al. | 342/358 |
| 6,069,899 A | * | 5/2000 | Foley | 370/494 |
| 6,088,386 A | * | 7/2000 | Spruyt et al. | 375/222 |
| 6,088,390 A | * | 7/2000 | Russell et al. | 375/233 |
| 6,101,172 A | * | 8/2000 | van Bavel et al. | 370/295 |
| 6,161,209 A | * | 12/2000 | Moher | 714/780 |
| 6,212,227 B1 | * | 4/2001 | Ko et al. | 375/222 |
| 6,246,716 B1 | * | 6/2001 | Schneider | 375/220 |
| 6,452,981 B1 | * | 9/2002 | Raleigh et al. | 375/299 |

* cited by examiner

*Primary Examiner*—Emmanuel Bayard
(74) *Attorney, Agent, or Firm*—Thomas, Kayden, Horstemeyer & Risley LLP

(57) ABSTRACT

A digital subscriber line (DSL) communication device employs a linear block interleaver for mathematically combining multiple symbols from a signaling constellation into n-symbol combinations in order to efficiently suppress or eliminate impulse noise generated in the communication channel. In architecture the linear block interleaver includes logic configured to combine multiple symbols from a signaling constellation into n-symbol combinations. The multiple symbols are mathematically combined such that noise energy present in at least one of the n-symbol combinations is spread among each of the multiple symbols, thus reducing the energy of the noise on each of the multiple symbols.

36 Claims, 8 Drawing Sheets

LINEAR BLOCK INTERLEAVER SYSTEM AND METHOD

CROSS REFERENCE TO RELATED APPLICATION

This document claims priority to and the benefit of the filing date of copending and commonly assigned U.S. Provisional Patent Application entitled LINEAR BLOCK INTERLEAVER, assigned Ser. No. 60/070,070, and filed Dec. 30, 1997 and is hereby incorporated by reference.

FIELD OF THE INVENTION

The present invention relates generally to data communications, and more particularly, to a system and method for suppressing impulse noise in a multipoint communications environment using a linear block interleaver.

BACKGROUND OF THE INVENTION

In the field of data communications, a modem is used to convey information from one location to another. Digital Subscriber Line (DSL) technology now enables modems or other devices to communicate rapidly large amounts of data. Devices communicate by modulating a baseband signal carrying digital data, converting the modulated digital data signal to an analog signal, and transmitting the analog signal over a conventional copper wire pair using techniques that are well known in the art. These known techniques include mapping the information to be transmitted into a signal space constellation, differentially encoding the information to reduce errors and improve throughput, and transmitting the information over a communication channel. The constellation can include both analog and digital information or often merely digital information. At a receiver, the signal is received, equalized, and decoded in accordance with techniques that are known in the art.

In the above mentioned communications system, a control device, i.e., one that is located at a telephone company central office, connects the communication channel to a plurality of remote devices typically located at a customer residential or business location. This topography is known as a multipoint communication environment because one control device is communicating with a plurality of remote devices co-located at a remote location, over a single communication channel.

The communication technique between the control device and the remote device is generally half duplex in nature, meaning that only one device may transmit at any particular time. Existing techniques such as carrierless amplitude/phase modulation (CAP) and discrete multitone (DMT) modulation allow modems to transmit simultaneously between only two devices at a time. In a multipoint environment, greater circuit efficiency is possible because of the ability to connect multiple devices to the same communication channel.

In any communication environment, noise is an ever present obstacle to optimal receiver performance. Noise imparted by the communication channel can be substantially eliminated through the use of well known techniques, such as precoding and channel equalization. Local noise imparted to a channel, such as periodic impulse noise, from local sources, such as electrical appliances and light dimmers, and random impulse noise, such as switching relays in a central office (CO), present an even greater problem that can degrade receiver performance.

All DSL equipment is susceptible to these impairments. In order to combat crosstalk, carrierless amplitude/phase (CAP) modulation uses a precoder, while discrete multi-tone (DMT) selectively disables the affected frequency bins. The 60 Hz periodic impluse noise (for example, that generated by a local electrical appliance such as a light dimmer) and other impulse noise generated for example by a switching relay at the central office is allowed to exist and the resulting errors are corrected by a Reed Solomon (RS) forward error correction code, sometimes in combination with a bit-wise interleaver. This arrangement works fairly well in point-to-point applications where the delay caused by the RS coding is not problematic, however, for multipoint applications, the RS and DMT codes are ineffective. For example, the precoder used with CAP is located in the transmitter, and will cause discontinuities when the transmitter is switched on and off, as frequently occurs in a multipoint environment. Furthermore, the control device in the multipoint environment can have but one set of precoder coefficients for broadcasting to all remote devices, which may have different precoder needs. Also, ringing caused by on/off polling cannot be canceled by a precoder because the transmitter and precoder are inoperable during the ringing transient.

Other error correction codes are available which can be used to reduce some of the errors caused by impulse noise. For example, block codes, and more specifically, linear block codes have been developed for use in communications systems to correct or reduce the number of burst errors in data transmission. However, these codes have excess delay and have been unable to successfully reduce or eliminate the type of random impulse noise generated by relay switching equipment in a telephone company central office.

Therefore, it would be desirable to provide a noise suppression system and method in both a transmitter and a receiver to reduce or eliminate the impulse noise imparted to a receiver, without the need for forward error correction.

SUMMARY OF THE INVENTION

The present invention provides an improvement to a communication environment by enabling a communication device to efficiently suppress impulse noise. This noise can be for example, switching relay noise imparted to the communication channel at a telephone company central office.

The present invention provides a system for noise suppression, the system comprising first logic, located in a transmitter of a communications device, configured to combine multiple symbols from a signaling constellation into n-symbol combinations and logic configured to transmit the n-symbol combinations to a receiver. At a receiver the linear block interleaver includes logic configured to receive the n-symbol combinations and second logic, located in the receiver of a communications device, configured to combine the n-symbol combinations in order to recover the original multiple symbols.

The present invention can also be conceptualized as a method for noise suppression, the method comprising the following steps. First, in a communications device, multiple symbols from a signaling constellation are combined into n-symbol combinations. The n-symbol combinations are then transmitted to a receiver. At a receiver the n-symbol combinations are received and combined in order to recover the multiple symbols.

The invention has numerous advantages, a few of which are delineated hereafter, as merely examples.

An advantage of the linear block interleaver is that it substantially reduces or eliminates impulse noise generated in the vicinity of a DSL receiver and elsewhere in the associated communication channel.

Another advantage of the linear block interleaver is that it has low throughput delay.

Another advantage of the linear block interleaver is that it is compatible with decision feedback equalizers and trellis coders.

Another advantage of the linear block interleaver is that it is low in complexity, simple in design, reliable in operation, and its design lends itself to economical mass production in communication devices.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each another, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and is executed by a suitable digital signal processor (DSP) situated in a communication device. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

Furthermore, the present invention is applicable to all coded or uncoded modulation schemes that are known in the art, and while described in the following preferred embodiment with respect to interleaving four symbols in a two-dimensional signal space constellation, is applicable to interleaving any number of symbols in any unidimensional or multidimensional signal space.

Figure 1:
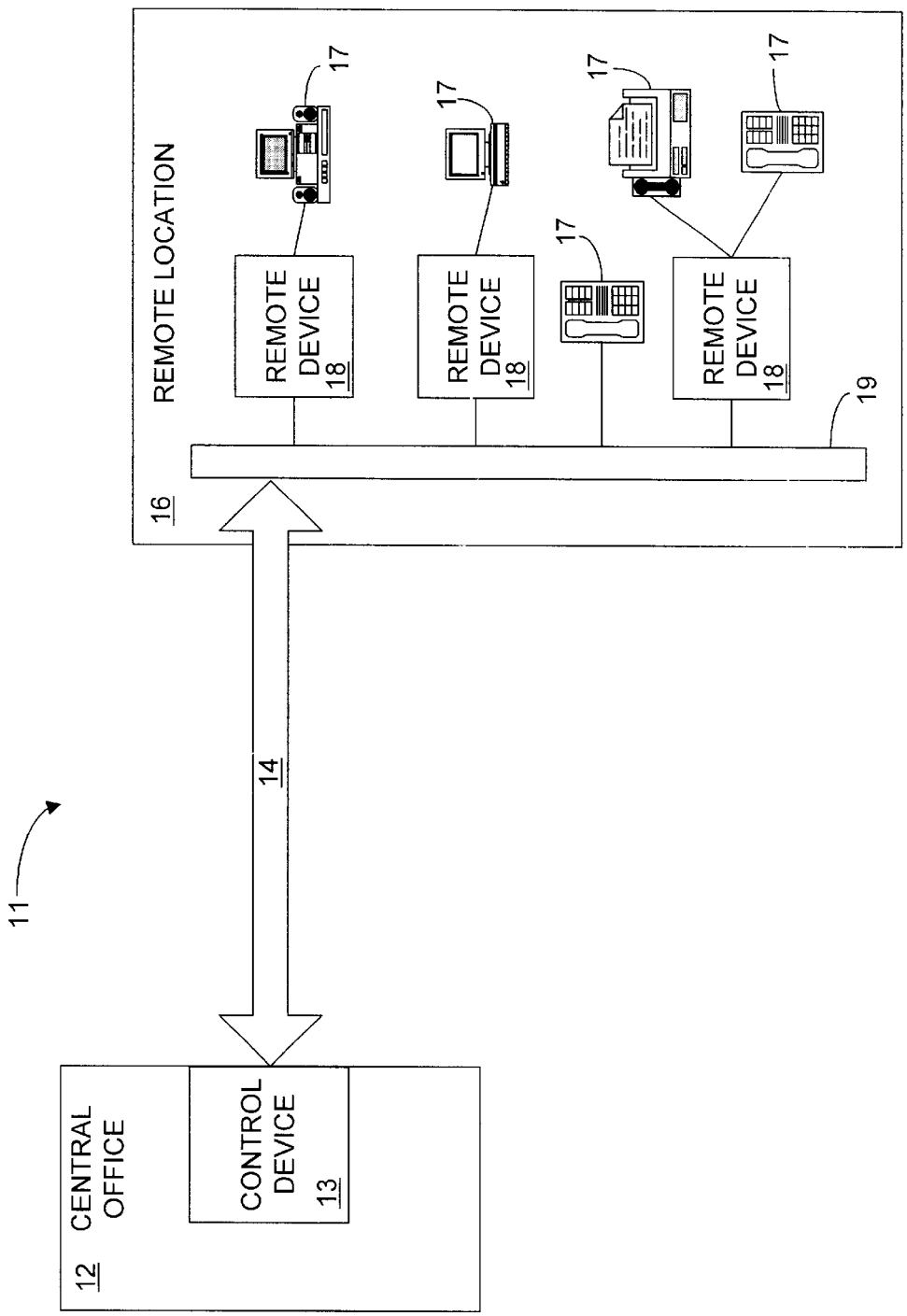
FIG. 1 is a schematic view illustrating a multipoint communications environment including a plurality of communication devices, each containing the linear block interleaver (not shown) of the present invention.

FIG. 1 shows a schematic view illustrating a multipoint communications environment 11 in which devices employing the linear block interleaver of the present invention are used. Remote location 16 is connected to central office location 12 via communication channel 14. In the preferred embodiment, control device 13 and remote device 18 are illustratively digital subscriber line (DSL) communication devices. However, the concepts of the present invention are applicable to various other types of communication devices. Located at central office location 12 is control device 13. Communication channel 14 is typically the copper wire pair that extends between a telephone company central office and a remote residential, business, or any other location served by local telephone service. Remote location 16 may contain a plurality of remote devices 18 connecting a plurality of user devices 17 to communication channel 14 via communication bus 19. In addition, user devices such as telephones may be connected directly to communication bus 19.

Communication bus 19 is illustratively the copper wiring infrastructure used throughout a remote location to connect remote devices 18 to communication channel 14. Remote devices 18 are typically located in a residential or business location. These locations often contain low frequency noise generating electrical appliances, such as light dimmers and other electrical devices, which typically generate low frequency impulse noise in the frequency range of 60–120 Hz. Furthermore, other signal generating sources may be located in the vicinity of remote device 18 or in the vicinity of control device 13. For example, switching relay devices located at central office 12 can impart random impulse noise to the communication channel, thus impairing the subscriber line connecting control device 13 to remote device 18. By using control device 13 and remote devices 18 employing the linear block interleaver of the present invention, it is possible for the receiver located in remote device 18 or control device 13 to efficiently suppress or cancel this impulse noise and crosstalk generated in it's vicinity and elsewhere in the communication system.

For simplicity, the linear block interleaver will be described as residing in the transmitter of control device 13 and receiver of remote device 18, however, the linear block interleaver system and method can be applied to any communication transmitter and receiver, including the transmitter located in remote device 18 and receiver located in control device 13.

Figure 2:
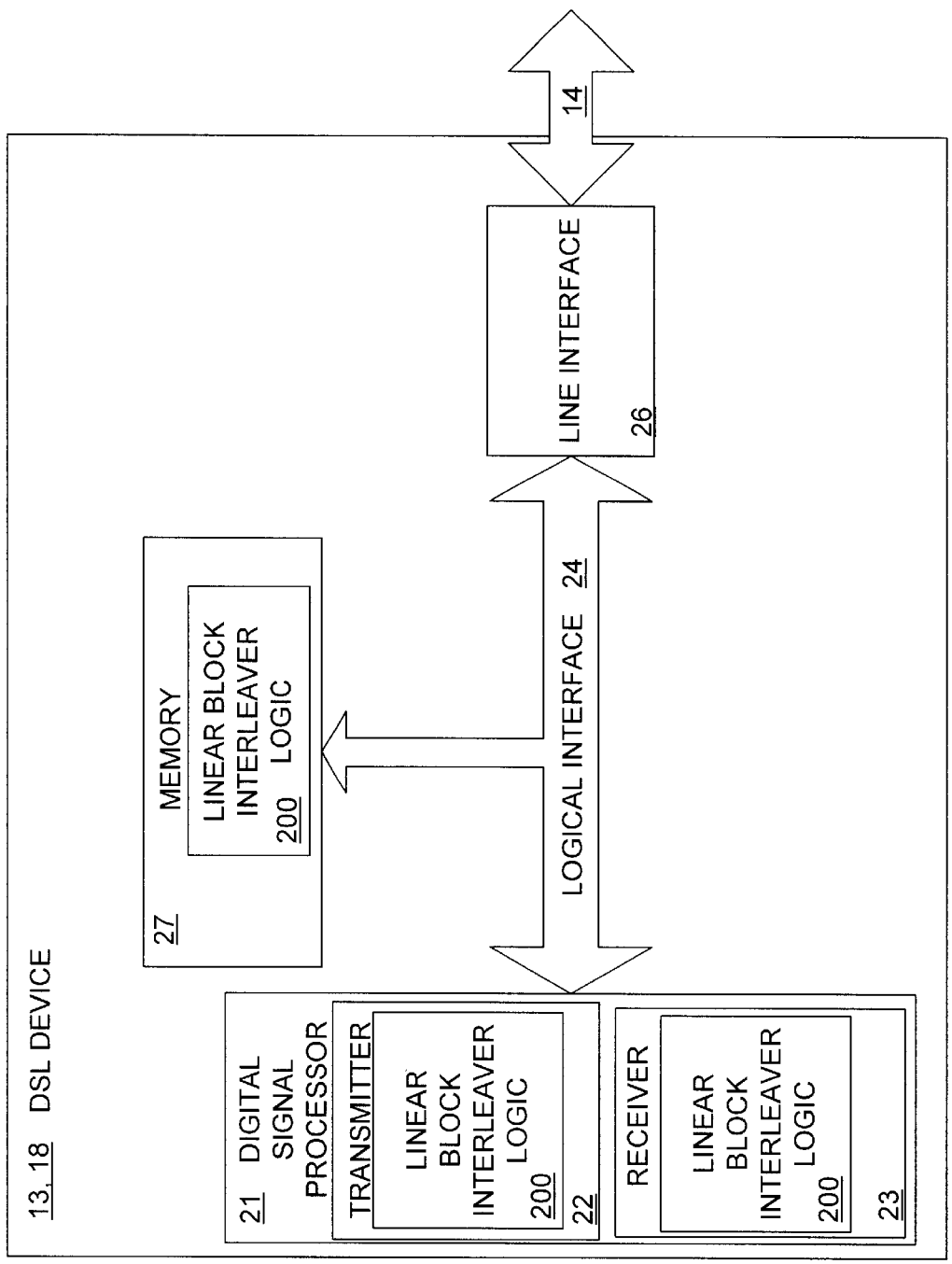
FIG. 2 is a block diagram of a communications device including the linear block interleaver logic of the present invention.

Now referring to FIG. 2, shown is a schematic view illustrating either remote device 18 or control device 13 of FIG. 1 including the linear block interleaver logic of the present invention. Typically, control device 13 will transmit signals to remote devices 18 over communications channel 14. Similarly remote devices 18 will transmit signals to control device 13.

Remote devices 18 and control device 13 contain linear block interleaver logic 200 which enable the devices to efficiently suppress or eliminate impulse noise imparted to the communication channel.

Still referring to FIG. 2, remote device 18 contains conventional components as is known in the art of data communications. Digital Signal Processor (DSP) 21 controls the operation of the devices' transmitter 22 and receiver 23, and couples to line interface 26 to gain access to communications channel 14. Also included in transmitter 22 and receiver 23 of remote device 18 is linear block interleaver logic 200 which enables remote device 18 to reliably and economically suppress or eliminate impulse noise generated in the vicinity of receiver 23 and elsewhere in the communication environment. Also contained within remote device 18 is memory 27, which also includes linear block interleaver logic 200. In a preferred embodiment, the linear block interleaver logic of the present invention is executed within DSP 21 and is therefore shown as residing in both DSP 21 and memory 27.

Figure 3:
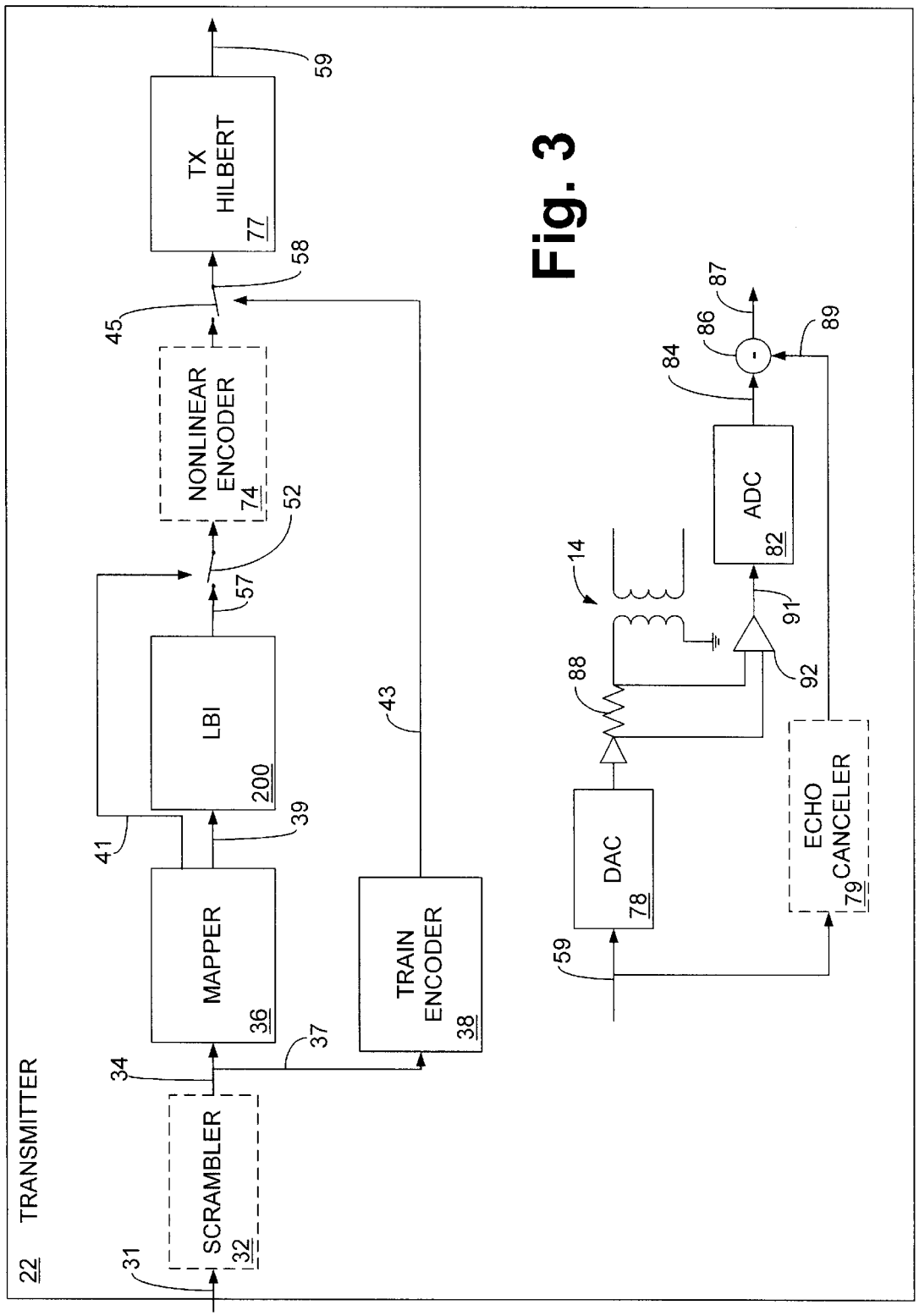
FIG. 3 is a block diagram illustrating a transmitter of FIG. 2 including the linear block interleaver of the present invention.

With reference now to FIG. 3, shown is a block diagram illustrating a transmitter 22 of a DSL communication device including the linear block interleaver 200 of FIG. 2.

Data, in the form of an N-bit data word, to be transmitted is input on line 31 to optional scrambler 32. In the absence of scrambler 32, data to be transmitted is input directly to mapper 36. Scrambler 32 can be either a self-synchronizing scrambler or a preset free running scrambler as known in the art. If scrambler 32 is employed, then a scrambled N-bit data word is supplied on line 34 to mapper 36. Mapper 36 supplies complex x and y vectors representing the data to be transmitted in a signal space constellation as known in the art, using for example, quadrature amplitude modulation (QAM). While the output of mapper 36 on line 39 is shown as a single line in this preferred embodiment, the output of mapper 36 is a multidimensional signal comprising complex x and y vectors. The concepts and features of the present invention are equally applicable to, for example, uni-dimensional signals such as those generated by a pulse amplitude modulation (PAM) signal. Furthermore, the concepts of the present invention are applicable to all modulation schemes as known in the art.

Alternatively, during a training phase, the N-bit data word is supplied on line 37 to train encoder 38. Train encoder 38 supplies a two level signal containing special x and y vectors to TX Hilbert filter 77 as known in the art, the signal bypassing the linear block interleaver 200 of the present invention during the training phase. The linear block interleaver 200 operates only on data to be transmitted, the operation of which will be discussed in detail with respect to FIGS. 4 and 5.

Additionally, signals such as "start of message" (SOM), "start of transmission" (SOT) or "0" are supplied by mapper 36 on line 41. These "special symbols" are used as disclosed in co-pending commonly assigned U.S. Patent Application entitled "SYSTEM AND METHOD FOR TRANSMITTING SPECIAL MARKER SYMBOLS", assigned Ser. No. 08/979,455, filed on Nov. 26, 1997, and are supplied to switch 52. These special symbols can be used to signal certain events during the transmission of information. For example, a SOM special symbol can be used to signal the start of a message. This information can be used by a receiving device to prepare for the receipt of a message, and are used by the transmitter and receiver described herein.

The output of train encoder 38 is supplied on line 43 to switch 45. Switch 52 and switch 45 are depicted in this preferred embodiment as separate because of the illustration of optional nonlinear encoder 74. In the absence of nonlinear encoder 74, the operation of switches 52 and 45 could be combined into one switch. Nonlinear encoder 74, if present, operates on the interleaved signal on line 57 to encode the interleaved signal for transmission.

Switches 52 and 45 select either the linear block interleaved data on line 57, the training data signal on line 43, or the special symbol or zero on line 41. It is important to allow the special symbol on line 41 to bypass the linear block interleaver 200 so that it may be detected by the receiver without the receiver knowing the interleaver framing.

After transmission of data is complete, the "end of file" (EOF) special symbol is sent, however the EOF special symbol is sent through the linear block interleaver 200, while mapper 36 will continue to transmit zero's to linear block interleaver 200 until the interleaver completes the last frame frame. Alternatively mapper 36 can transmit the smallest valid non-zero amplitude signal following the EOF special symbol in order to facilitate operation of a decision feedback equalizer in the remote receiver (to be discussed with respect to FIG. 6).

The output of TX Hilbert filter 77 on line 59 is a single real output of a two dimensional complex input containing both the x and y component of the complex vector. The x and y component are summed and then supplied to digital-to-analog (DAC) converter 78 and to optional echo canceler 79, which if present operates conventionally. While TX Hilbert filter 77 is employed in the case of carrierless amplitude/phase modulation (CAP), other modulation schemes, such as QAM, can benefit from the features of the linear block interleaver described herein.

The output of DAC 78 is supplied to a conventional hybrid circuit, which is represented by communication channel 14. Differential amplifier 92 takes the transmit signal across resistor 88, which represents transmission impedance, and supplies it on line 91 to analog-to-digital converter (ADC) 82, which picks up the receive signal. The output of ADC 82 is supplied on line 84 to subtractor 86, which subtracts the output of optional echo canceler 79 on line 89 and provides the receive signal on line 87 to receiver 23, to be discussed with respect to FIG. 6.

Figure 4:
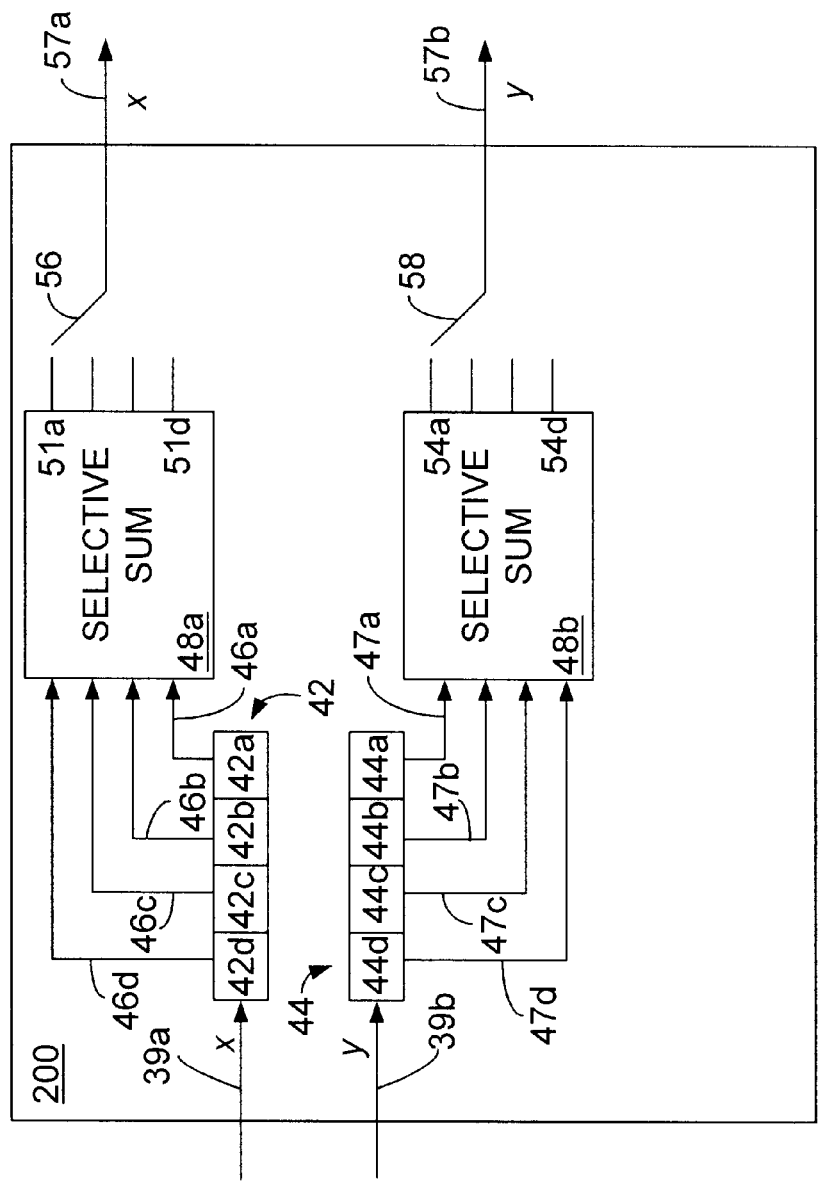
FIG. 4 is a block diagram illustrating the operation of the 2-dimensional linear block interleaver of FIG. 3.

FIG. 4 shows a block diagram illustrating the operation of the 2-dimensional linear block interleaver of FIG. 3. While shown in this preferred embodiment as operating on a two-dimensional signal, the linear block interleaver 200 of the present invention can operate on any signal. Referring back to FIG. 3, the output of mapper 36 on line 39 contains complex x and y vectors. Because the preferred embodiment of the linear block interleaver 200 operates on a two dimensional signal, line 39 of FIG. 3 is illustrated as lines 39a and 39b in FIG. 4. Illustratively, line 39a contains the x component of the complex vector and line 39b contains the y component of the complex vector.

Still referring to FIG. 3, at the end of training, train encoder 38 is disengaged and transmit data is selected by operation of switches 52 and 45, which will select the output of linear block interleaver 200 and apply it to TX Hilbert filter 77. Linear block interleaver 200 will collect n data symbols to be transmitted and will linear block interleave the symbols as follows.

Referring again to FIG. 4, a 4-symbol linear block interleaver is shown. The first symbol represented as a complex vector including the x component of the complex vector is supplied on line 39a to shift register 42, where after 4 symbol times location 42a will contain the first symbol, location 42b will contain the second symbol, location 42c will contain the third symbol and location 42d will contain the fourth symbol of the block interleaver frame. Similarly, the y component of the complex vector is supplied on line 39b to register 44, where after 4 symbol times, location 44a will contain the first symbol, location 44b will contain the second symbol, location 44c will contain the third symbol and location 44d will contain the fourth symbol.

From register 42, the contents are supplied to selective sum device 48a. The content of register location 42a is supplied on line 46a, the content of register location 42b is supplied on line 46b, the content of register location 42c is supplied on line 46c, and the content of register location 42d is supplied on line 46d. Similarly, the contents of register 44 are supplied to selective sum device 48b. Register location 44a is supplied on line 47a, register location 44b is supplied on line 47b, register location 44c is supplied on line 47c, and register location 44d is supplied on line 47d.

Selective sum devices 48a and 48b contain logic that is used to selectively sum the vectors supplied on lines 46a–46d and lines 47a–47d respectively. Each selective sum device provides four outputs, lines 51a through 51d for selective sum device 48a, and lines 54a through 54d for selective sum device 48b. The four outputs of each selective sum device correspond to the four interleaver equations illustrated in this preferred embodiment.

Switches 56 and 58 are commutator type switches that will select the output of the first interleaver equation for transmission to TX Hilbert filter 77 on lines 57a and 57b (which are shown as single line 57 in FIG. 3) at the first data symbol after the training phase is complete.

The 4-symbol block interleaver equations are as follows. The same equations that are used in the transmitter for interleaving are used in the receiver for de-interleaving. Both x and y coordinates of each constellation point of each symbol are independently interleaved. All symbols may be arithmetically combined into all n-symbols of a symbol block. A larger block provides greater impulse compression and protects against impulses that span multiple symbol intervals. A variation allows only subgroups of symbols to be arithmetically combined with each other and then these subgroups to be interleaved among themselves over the entire block. This variation provides the same spread over time of an impulse that spans multiple symbols but has the advantage of a lower peak signal power, lower delay before error signals are available for adaptive algorithms or decision feedback equalizers, and lower burst processing cycle time.

The interleaver equations include a gain factor of $2^{-n/4}$ or $(-3*n/2)$ dB to maintain nominal power. The following equations are examples of a 4-symbol linear block interleaver.

$x=(iLBIx[0]+iLBIx[1]+iLBIx[2]+iLBIx[3])*0.5;$ $y=(iLBIy[0]+iLBIy[1]+iLBIy[2]+iLBIy[3])*0.5;$ $iLBIx[4]=(iLBIx[0]+iLBIx[1]-iLBIx[2]-iLBIx[3])*0.5;$ $iLBIy[4]=(iLBIy[0]+iLBIy[1]-iLBIy[2]-iLBIy[3])*0.5;$ $iLBIx[5]=(iLBIx[0]-iLBIx[1]+iLBIx[2]-iLBIx[3])*0.5;$ $iLBIy[5]=(iLBIy[0]-iLBIy[1]+iLBIy[2]-iLBIy[3])*0.5;$ $iLBIx[6]=(iLBIx[0]-iLBIx[1]-iLBIx[2]+iLBIx[3])*0.5;$ $iLBIy[6]=(iLBIy[0]-iLBIy[1]-iLBIy[2]+iLBIy[3])*0.5;$

The buffered input symbols are iLBIx[0–3] and iLBIy [0–3]. The interleaved output samples are x and y for the first symbol. Then iLBIx[4–6] and iLBIy[4–6] are buffered outputs for the last 3 symbols of the block.

While not illustrated in the preferred embodiment, the set of equations for a 2-symbol block interleaver are as follows:

$x=(iLBIx[0]+iLBIx[1])*0.707;$ $y=(iLBIy[0]+iLBIy[1])*0.707;$ $iLBIx[4]=(iLBIx[0]+iLBIx[1]*0.707;$ $iLBIy[4]=(iLBIy[0]+iLBIy[1]*0.707;$ and the set of equations for 2 interleaved 2-symbol blocks are as follows:

$x=(iLBIx[0]+iLBIx[1]*0.707;$ $y=(iLBIy[0]+iLBIy[1]*0.707;$ $iLBIx[4]=(iLBIx[0]+iLBIx[3])*0.707;$ $iLBIy[4]=(iLBIy[0]+iLBIy[3])*0.707;$ $iLBIx[5]=(iLBIx[0]-iLBIx[1])*0.707;$ $iLBIy[5]=(iLBIy[0]-iLBI[1])*0.707;$ $iLBIx[6]=(iLBIx[2]-iLBIx[3])*0.707;$ $iLBIy[6]=(iLBIy[2]-iLBIy[3])*0.707;$

Figure 5:
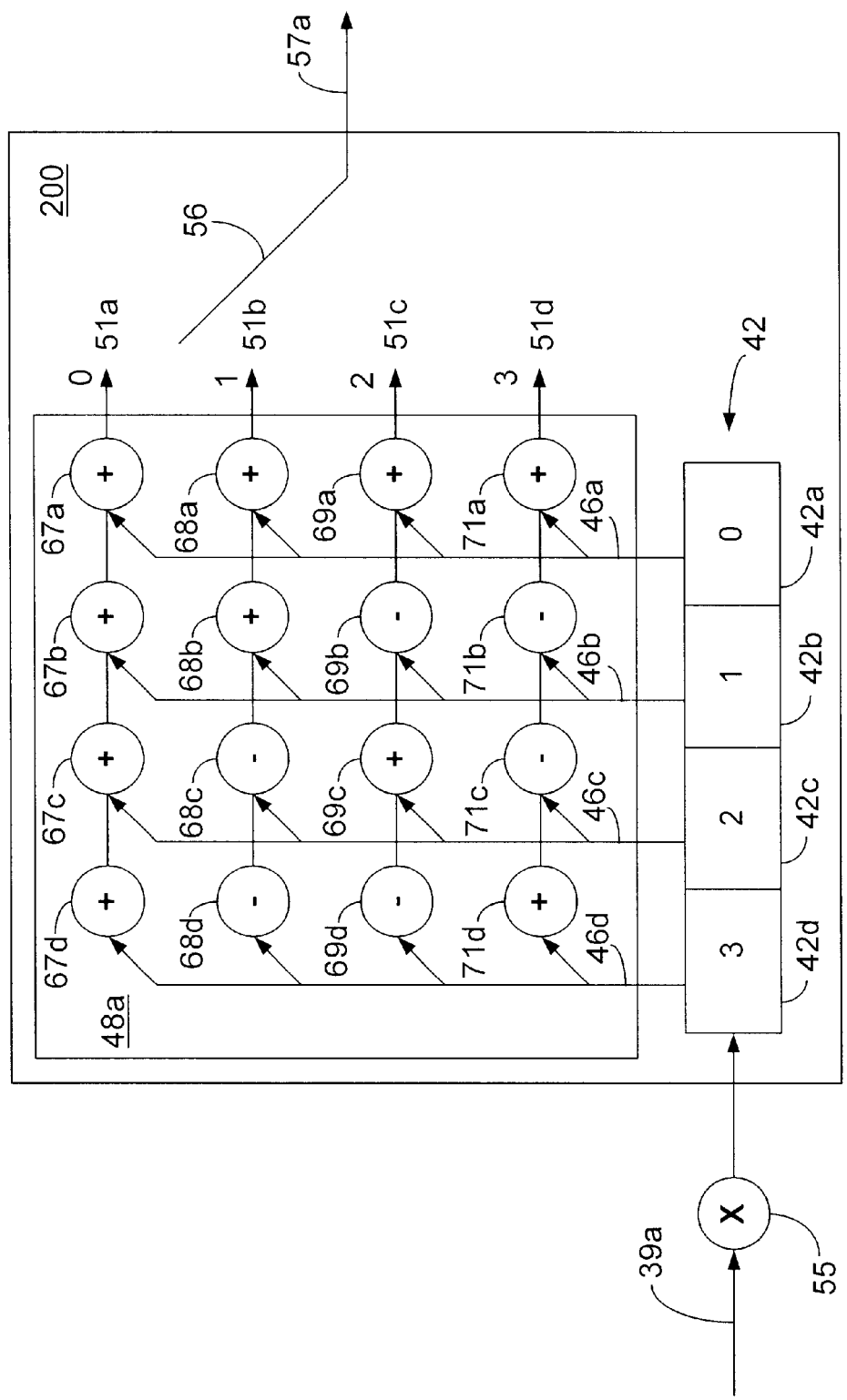
FIG. 5 is a block diagram illustrating the operation of the arithmetic of a single dimension of the linear block interleaver of FIG. 4.

FIG. 5 is a block diagram illustrating the operation of the arithmetic of a single dimension of the linear block interleaver of FIG. 4. Linear block interleaver 200 contains selective sum device 48a. While linear block interleaver 200 is shown in the preferred embodiment as operating on a two dimensional signal (i.e., the x and y component of the complex signal) the operation of selective sum device 48a and 48b are identical.

Selective sum device 48a contains an array of arithmetic operators 67a–67d, 68a–68d, 69a–69d, and 71a–71d, which selectively sum the values contained in shift register locations 42a through 42d according the linear block interleaver equations mentioned herein.

Illustratively, the x component of the complex vector on line 39 of FIG. 3 is supplied on line 39a of FIG. 5 to multiplier 55. Multiplier 55 scales the x component of the complex vector by a factor of $2^{-n/4}$ and then supplies the x component to register 42. Scaling at the input to selective sum device 48a reduces the dynamic range of the input signal, which can reduce the complexity of the mathematical logic. Alternatively, the x component may be scaled within or at the output of selective sum device 48a.

As mentioned with respect to FIG. 4, register 42 includes, for this 4-symbol preferred embodiment, four register locations 42a–42d, which contain the first 4 symbols to be transmitted. The symbols are supplied on lines 46a–46d to selective sum device 48a. For example, arithmetic operators 67a through 67d are adders, which add the four symbols contained in register locations 42a through 42d according to the first x interleave equation above. Similarly, arithmetic operators 68a through 68d, (where 68a and 68b are adders and 68c and 68d are subtractors) operate on the contents of register locations 42a through 42d in accordance with the second x interleave equation above. Similarly, arithmetic operators 69a–69d and arithmetic operators 71a–71d operate on the contents of register locations 42a through 42d in accordance with the third and fourth x interleave equations respectively. In this manner all symbols contained in register 42 are interleaved.

Switch 56 functions as described with respect to FIG. 4 in that it act as a commutator to select the output of the first interleaver equation on line 51a for transmission to TX Hilbert filter 77 on line 57a at the first data symbol after the training phase is complete. Switch 56 then selects the second interleaver output on line 51b for output to TX Hilbert filter and so on until all four interleaved outputs are selected.

In a similar manner, selective sum device 48b of FIG. 4 operates on the y component of the complex vector supplied on line 39b to register 44 of FIG. 4.

Simply stated, the linear block interleaver 200 mathematically combines multiple symbols from a signaling constellation into a block of n-symbol combinations such that energy from each original symbol is transmitted in all n-symbol combinations of the n-symbol block. As will be discussed with respect to FIG. 6, the receiver 23 mathematically combines the received n-symbol combinations to recover the original independent symbols.

For example in the case of n=2, symbols A and B which were to be transmitted sequentially, first A then B, are transmitted as first A'=0.707(A+B) and then B'=0.707(A−B). The receiver, after receiving both symbols recovers the original symbols by combining A=0.707(A'+B') and B=0.707(A'−B'). This operation beneficially reduces the magnitude of any impulse noise by spreading the impulse energy over all n-symbols reducing the impulse by (3*n/2) dB or 3 dB in the case of n=2. If A' is received with impulse I as (A'+I) then the recovered symbols will be (A+0.707*I) and (B+0.707*I). The impulse is attenuated by a factor of 0.707 or 3 dB.

Figure 6:
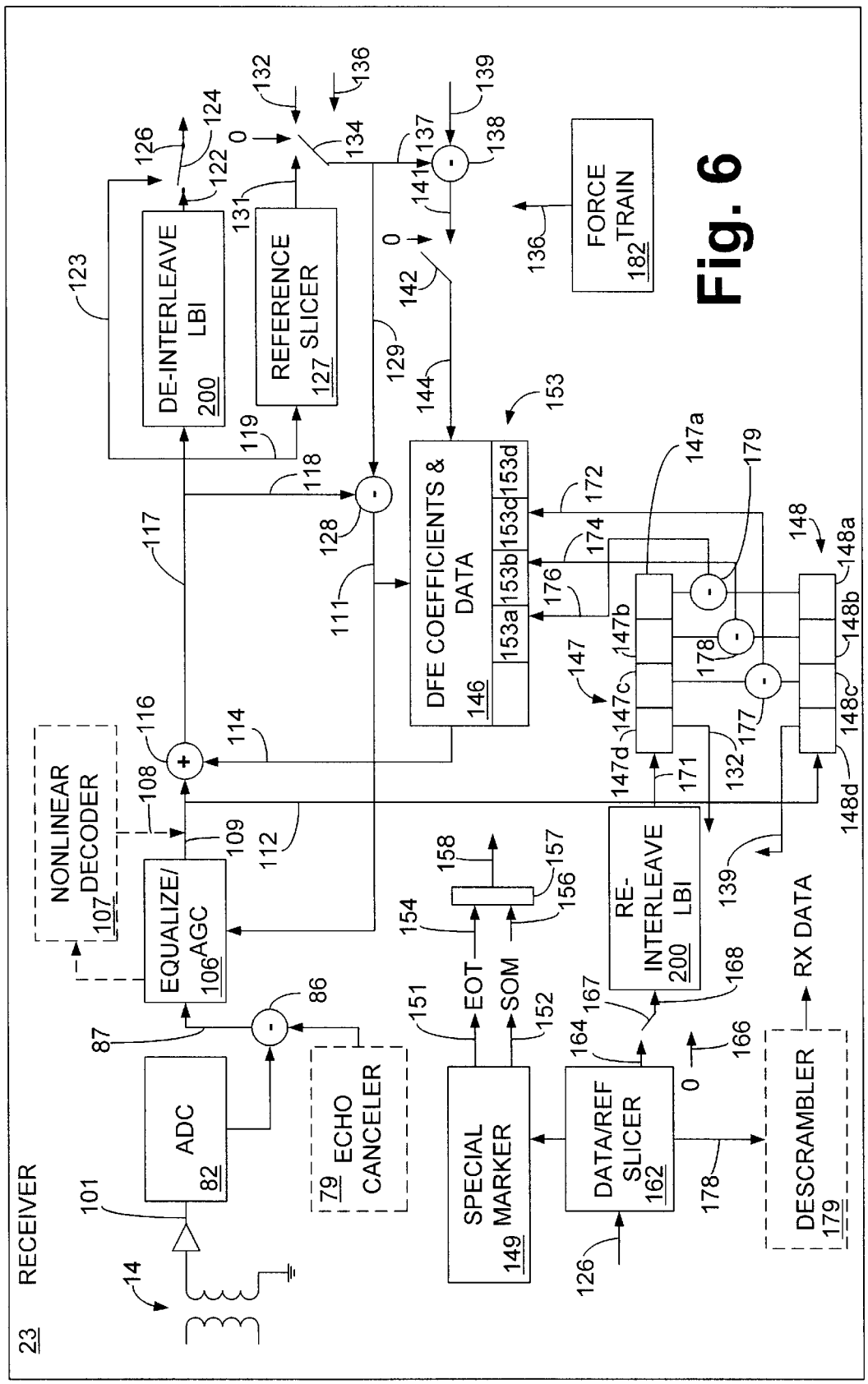
FIG. 6 is a block diagram illustrating a receiver of FIG. 2 including the linear block interleaver of the present invention.

FIG. 6 shows a receiver including the linear block interleaver of the present invention. A receive signal is supplied by communication channel 14 to line 101. The receive signal is then supplied to ADC 82 for conversion to the digital domain. The output of ADC 82 has the output of optional echo canceler 79 subtracted therefrom in subtractor 86. Optional echo canceler functions conventionally and, if employed, supplies an echo canceled receive signal on line 87 to equalizer/automatic gain control (AGC) circuit 106. The output of equalizer/AGC circuit 106 is optionally supplied to nonlinear decoder 107 if nonlinear encoder 74 is used in transmitter 22.

The output of equalizer/AGC circuit 106 is supplied on line 112 to four stage delay element 148. Delay element 148 is preferably a shift register, which stores previous outputs of the equalizer/AGC circuit 106. Register 148 stores as many samples as there are symbols in the linear block interleaver 200, in this preferred embodiment register 148 is a four stage delay element to correspond to the four symbol linear block interleaver 200 described herein.

The output of equalizer/AGC circuit 106 is also supplied to adder 116, which adds the output of decision feedback equalizer (DFE) 146 to the output on line 109. The operation of DFE 146 is described in detail in commonly assigned, copending U.S. Patent Application entitled "ADAPTIVE COMB FILTER AND DECISION FEEDBACK EQUALIZER FOR NOISE SUPRESSION", assigned Ser. No. 08/992,498, and filed on Dec. 17, 1997.

The output of adder 116 is then supplied on line 117 to linear block interleaver 200, which will de-interleave the interleaved transmit signal using the same equations described with reference to FIGS. 4 and 5. The output of linear block interleaver 200, which in this application is de-interleaving, is supplied on line 122 through switch 124 to line 126 for input to data/reference slicer 162. Switch 124 will bypass the linear block interleaver 200 to send SOM or SOF special symbols and zero's preceding the message as described with reference to FIG. 3.

The output of data/reference slicer 162 on line 178, which is decoded data, is sent to optional descrambler 179 if scrambler 32 is employed in transmitter 22 and output from optional descrambler 179 as user data.

Another output of data/reference slicer 162 on line 164 is an ideal reference signal that is passed through switch 167 to linear block interleaver 200, which in this application operates as a re-interleaver. When operating as a re-interleaver linear block interleaver 200 uses the same equations as described with reference to FIGS. 4 and 5. Switch 167 selects a zero reference when the output carrier is off preceding the SOM special symbol and following the end of transmission "EOT" special symbol. Linear block interleaver 200, in re-interleave mode will re-interleave the ideal reference signal supplied from data/reference slicer 162 on line 168. Linear block interleaver 200 will send the re-interleaved ideal reference output on line 171 to four stage delay element 147. Delay element 147 is an n stage register which stores one frame of the output of the re-interleaved symbols and operates similarly to register 148.

The last stored symbol of the linear block interleaver frame in register location 147d, which is the one exceptionally good ideal reference symbol, will be supplied on line 132 to switch 134. Switch 134 selects the re-interleaved (best) ideal reference signal at the end of the linear block interleaver 200 frame and a best estimate reference on line 131 from reference slicer 127 and sends this signal on line 129 to subtractor 128 where it is subtracted from the combined output of equalizer/AGC circuit 106 and DFE 146 on line 118, and is sent on line 111 as an update signal for both the equalizer/AGC circuit 106 and DFE 146.

The ideal reference signal on line 132 is also sent through switch 134 on line 137 to subtractor 138. Subtractor 138 subtracts the ideal reference signal on line 137 from the output of equalizer/AGC circuit 106 which was supplied on line 112 to register 148. The last symbol in register location 148d, which is the last symbol from equalizer/AGC circuit 106, is supplied on line 139 to subtractor 138. The output of subtractor 138 is passed through switch 142, which optionally selects a zero DFE input for all but the last (best) re-interleaved sample, and is used as input to DFE 146 on line 144. The optional zero DFE input can be used to replace reference slicer 127 for lower complexity.

Because the last symbol of the block has been interleaved it is a special case. It has been de-interleaved, sliced to determine the actual ideal references and re-interleaved and placed in register 147d. It is then subtracted from the output of the equalizer and used as an input to the DFE.

Reference slicer 127 generates an ideal reference signal on line 131 without decoding the data, and allows the slicing of the interleaved symbols themselves. When the interleaved symbols are sliced however, the protection of the interleaver is lost. This means that there is a potential for an error that won't occur after de-interleaving and explains why the last symbol is exceptionally good. The remaining symbols will be operated upon by reference slicer 127, which will slice every symbol before de-interleaving.

During the time that the training signal is sent by train encoder 38 in transmitter 22, force train element 182 is selected in order to generate the ideal references which will be supplied through switch 134 for training equalizer/AGC circuit 106 and DFE 146. Prior to the "start of frame" (SOF) special symbol and following the linear block interleaver frame containing the EOF special symbol, switch 134 selects a zero reference to subtractors 128 and 138.

With respect to updating DFE 146, estimated references are supplied by reference slicer 127 while linear block interleaver 200 collects all of the symbols of the block of a frame. Switch 134 selects the estimated ideal reference signal on line 131 from reference slicer 127 and supplies that signal to subtractors 138 and 128, which generate the input signal to DFE 146 and the updates for DFE 146 and equalizer/AGC circuit 106. The estimated ideal reference signals from reference slicer 127 are susceptible to impulse errors because they have not been processed through linear block interleaver 200.

Once a full frame of symbols have been collected in linear block interleaver 200 for de-interleaving, they are de-interleaved, processed by the data/reference slicer 162 and linear block interleaver 200, re-interleaved and sent to register 147, which holds one frame of re-interleaved references. DFE 146 stores past error samples in shift register 153 for convolution with the DFE coefficients as is known in the art. Shift register position 153*d* is the most recent error sample and is loaded from subtractor 138. Shift register position 153*c* is the previous sample from position 153*d* as known in the art. Prior to the end of a linear block interleaver frame, samples in positions 153*a*, 153*b*, and 153*c* were generated by estimated reference slicer 127, which does not have protection of the de-interleaver. Therefore, at the end of each linear block interleaver frame, positions 153*a*, 153*b* and 153*c* are recomputed by subtractors 179, 178 and 177, respectively, using the better protected re-interleaved samples.

Accurate error signals can only be computed after the last symbol of any group or block is received. For the 4-symbol or 2-symbol blocks the error is available only once at the end of every block. For 2 interleaved 2-symbol blocks the error can be computed for the last 2 symbols of the composite 4 symbol block. Three interleaved 2-symbol blocks can be transmitted in a staggered order such that an error signal is available every alternate symbol. The sequence of symbol is as follows:

$$(3+4)(1-2)(5+6)(3-4)(7+8)(5-6)(9+10)(7-8)(11+12)(9-10)$$

The error signal can be computed for each subtraction pair.

Figure 7:
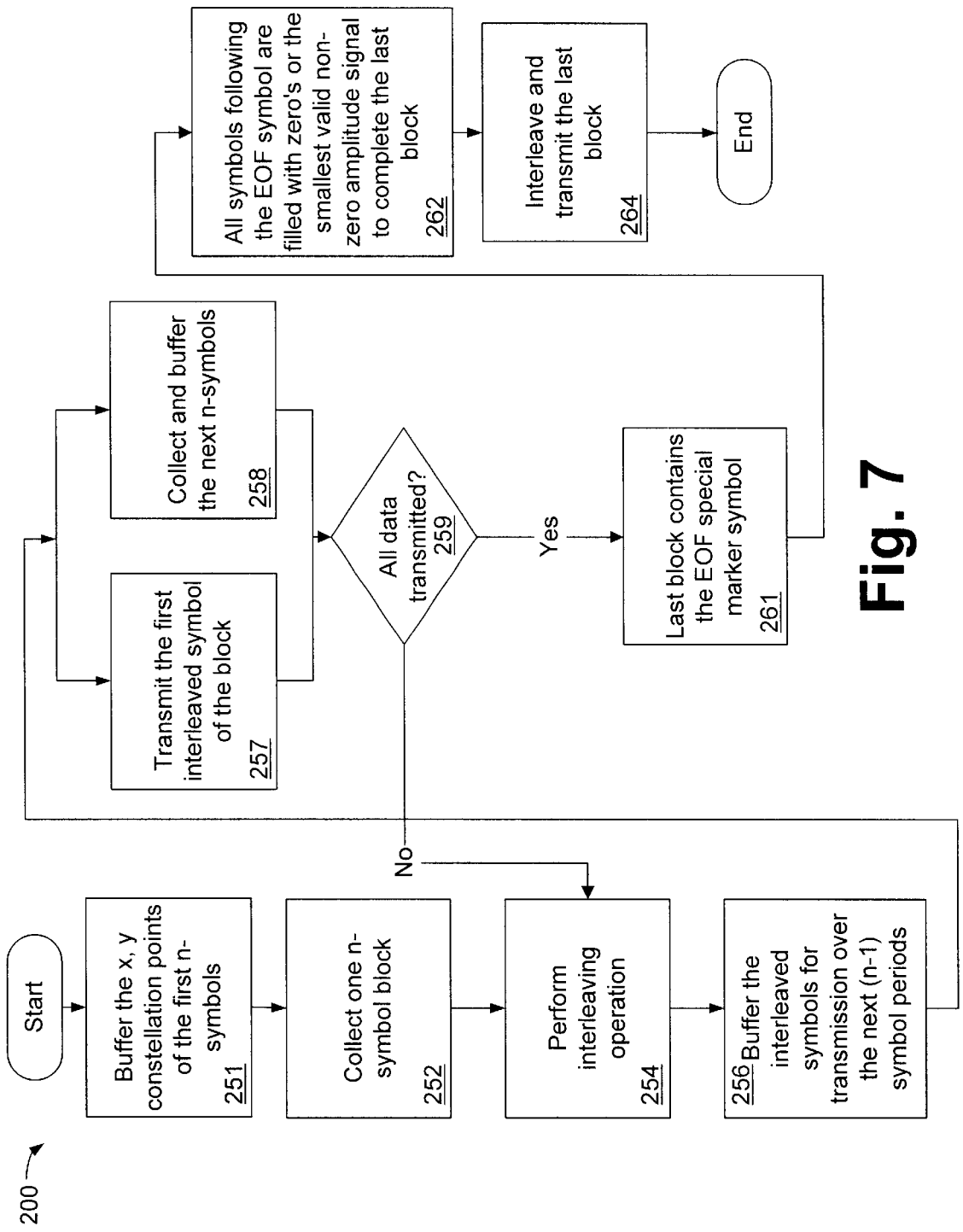
FIG. 7 is a flow chart illustrating the operation of the transmitter and the linear block interleaver of FIG. 4.

Referring now to FIG. 7, shown is a flow chart 200 illustrating the operation of the linear block interleaver of FIG. 4.

The linear block interleaver 200 arithmetically combines n-symbols in an n-symbol block. The sequence of steps is as follows.

In block 251 at the start of transmission the x and y constellation points of the first n-symbols are buffered.

In block 252 one n-symbol block is collected and in block 254 the interleaving operation is performed in accordance with the description in FIGS. 3, 4 and 5 and in accordance with the interleaving equations described herein.

Block 256 shows that the interleaved symbols are buffered for transmission over the next (n−1) symbol periods and in block 257 the first interleaved symbol of the block is transmitted. While continuing to transmit the block, simultaneously, in block 258, the next n-symbols are collected and buffered. The operations in blocks, 254, 256, 257 and 258 are repeated until all data has been transmitted.

In block 261 the last block will contain the "end of file" (EOF) special symbol and in block 262 all symbols after the EOF special symbol are filled in with zero's or the smallest valid non-zero amplitude signal in order to complete the last block.

In block 264 the last block is interleaved and transmitted.

Figure 8:
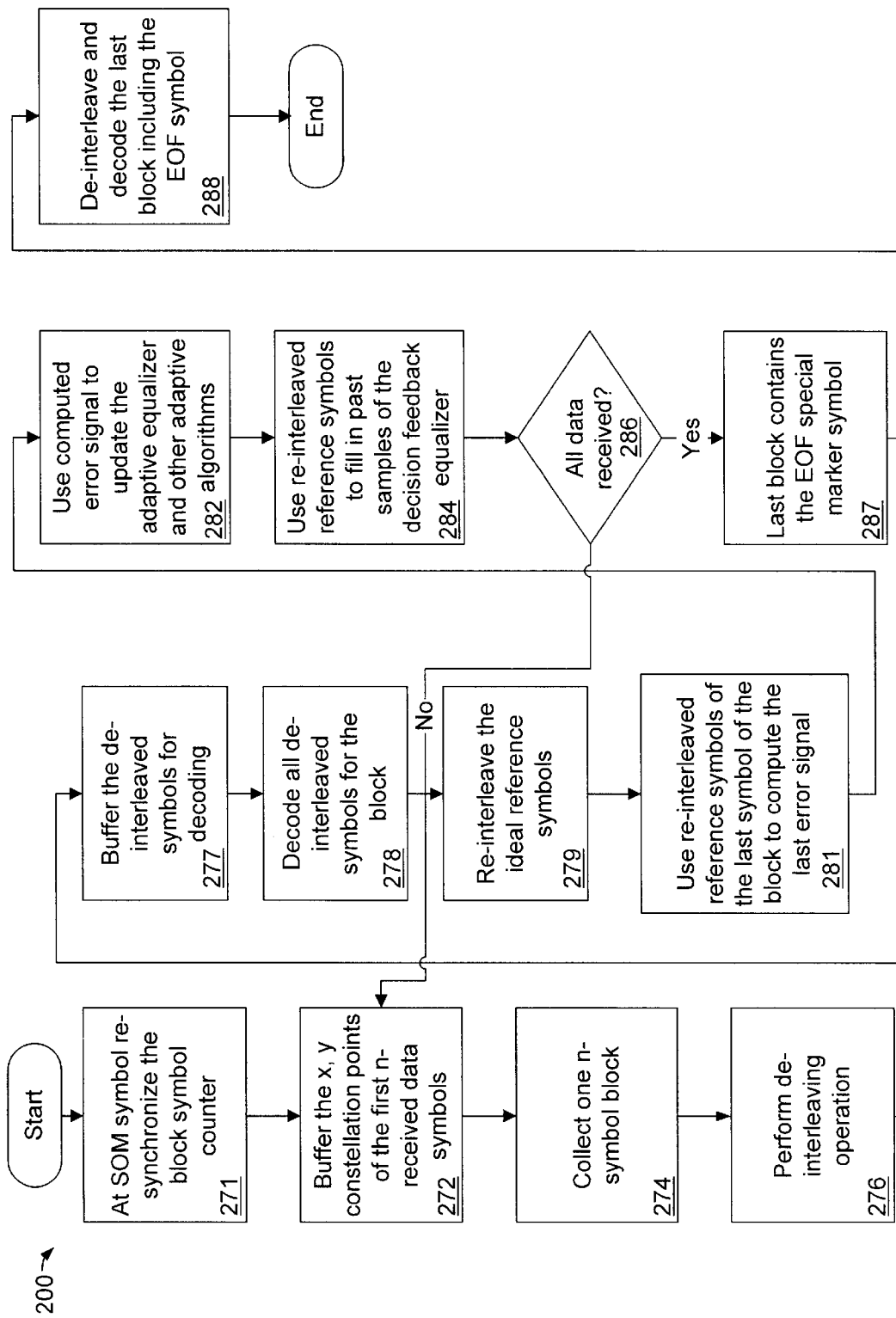
FIG. 8 is a flow chart illustrating the operation of the receiver and the linear block interleaver of FIG. 6.

FIG. 8 shows a flow chart illustrating the operation of the receiver and the linear block interleaver of FIG. 6.

The receiver 23 performs the same sequence of steps for decoding and additional re-interleave steps to compute error signals for updating adaptive algorithms.

In block 271 the receiver 23 waits for the "start of message" (SOM) special symbol, which is sent without interleaving. Once received, the receiver will re-synchronize the block symbol counter. The SOM special symbol is a high power symbol with margin well above the preceding idle channel.

In block 272 the x and y constellation points of the first n-received data symbols are buffered and in block 274 one n symbol block is collected.

In block 276 the de-interleaving operation is performed and in block 277 the de-interleaved symbols are buffered for decoding.

In block 278 all the de-interleaved symbols of the block are decoded and in block 279 the ideal reference symbols supplied by data/reference slicer 162 are re-interleaved.

Block 281 shows that the re-interleaved reference symbols of the last symbol block are used to compute the last error signal.

In block 282 the error signal computed in block 281 is used to update the equalizer/AGC circuit 106, the DFE 146 and any other adaptive algorithms.

In block 284 the re-interleaved reference symbols are used to fill in past samples of DFE 146 on lines 172, 174 and 176 of FIG. 6 and in block 286 the operation of blocks 272, 274, 276, 277, 278, 279, 281, 282 and 284 is repeated until all data has been received as signaled by a frame containing the EOF special symbol.

In block 287 the last block to be transmitted will contain the EOF special symbol and in block 288 the last transmitted block will be de-interleaved and decoded including the EOF special symbol.

Many variations are contemplated without departing from the spirit and scope of the present invention. For example, while illustrated herein as a 4-symbol linear block interleaver, other length linear block interleavers are possible. Furthermore, other modulation schemes, such as quadrature amplitude modulation (QAM) can benefit from the linear block interleaver.

Therefore the following is claimed:

1. A system for noise suppression, the system comprising:

first logic, located in a transmitter of a communications device, configured to combine a block of multiple symbols from a signaling constellation into a block of n-symbol combinations, wherein said block of n-symbol combinations includes n-input symbols per block and n-output symbols per block, and wherein each of said n-output symbols contains a weighted sample of all of said n-input symbols; and transmitter logic configured to transmit said n-symbol combinations to a receiver.

2. The system as defined in claim 1, further comprising:

receiver logic configured to receive a transmitted signal; and second logic, located in a receiver of a communications device, configured to combine said block of n-symbol combinations in order to recover said block of multiple symbols.

3. The system as defined in claim 1, wherein said block of multiple symbols are transmitted sequentially.

4. The system as defined in claim 1, further comprising logic configured to attenuate said block of multiple symbols by an attenuation factor.

5. The system as defined in claim 1, wherein said first logic further includes logic configured to mathematically combine a first symbol and a second symbol.

6. The system as defined in claim 1, wherein noise energy present in at least one of said block of n-symbol combinations is spread among each symbol of said block of multiple symbols such that the energy of the noise is reduced on each symbol of said block of multiple symbols.

7. The system as defined in claim 2, wherein said second logic further includes logic configured to mathematically combine a first symbol and a second symbol.

8. The system as defined in claim 2, wherein said second logic further includes logic configured to re-interleave said block of n-symbol combinations in order to generate error signals used to update adaptive algorithms.

9. The system as defined in claim 1, wherein said n-symbol combinations define a block.

10. A method for noise suppression, the method comprising the steps of:

combining, in a transmitter of a communications device, a block of multiple symbols from a signaling constellation into a block of n-symbol combinations, wherein said block of n-symbol combinations includes n-input symbols per block and n-output symbols per block, and wherein each of said n-output symbols contains a weighted sample of all of said n-input symbols; and transmitting said n-symbol combinations to a receiver.

11. The method as defined in claim 10, further comprising the steps of:

receiving, in a receiver, said n-symbol combinations; and combining, in said receiver, said block of n-symbol combinations in order to recover said block of multiple symbols.

12. The method as defined in claim 10, wherein said step of transmitting includes the step of sequentially communicating said block of n-symbol combinations.

13. The method as defined in claim 10, further comprising the step of attenuating said block of multiple symbols by an attenuation factor.

14. The method as defined in claim 10, wherein said step of combining multiple symbols, further comprises the steps of:

mathematically combining a first symbol and a second symbol to obtain a first prime symbol; and mathematically combining said first symbol and said second symbol to obtain a second prime symbol.

15. The method as defined in claim 10, wherein noise energy present in at least one of said block of n-symbol combinations is spread among each symbol of said block of multiple symbols such that the energy of the noise is reduced on each symbol of said block of multiple symbols.

16. The method as defined in claim 11, wherein said step of combining said n-symbol combinations, further comprises the steps of:

mathematically combining a first prime symbol and a second prime symbol to obtain a first symbol; and mathematically combining said first prime symbol and said second prime symbol to obtain a second symbol.

17. The method as defined in claim 11, further comprising the step of reinterleaving said block of n-symbol combinations in order to generate error signals used to update adaptive algorithms.

18. The method as defined in claim 10, further comprising the step of forming said n-symbol combinations into a block.

19. A computer readable medium having a program for noise suppression, the medium comprising:

first logic configured to combine, in a transmitter of a communications device, a block of multiple symbols from a signaling constellation into a block of n-symbol combinations, wherein said block of n-symbol combinations includes n-input symbols per block and n-output symbols per block, and wherein each of said n-output symbols contains a weighted sample of all of said n-input symbols; and transmitter logic configured to transmit said n-symbol combinations to a receiver.

20. The medium as defined in claim 19, further comprising:

receiver logic configured to receive said block of n-symbol combinations; and second logic configured to combine, in said receiver, said block of n-symbol combinations in order to recover said block of multiple symbols.

21. The medium as defined in claim 19, wherein said block of n-symbol combinations are transmitted sequentially.

22. The medium as defined in claim 19, further comprising logic configured to attenuate said block of multiple symbols by an attenuation factor.

23. The medium as defined in claim 19, wherein said first logic, further comprises:

logic configured to mathematically combine a first symbol and a second symbol to obtain a first prime symbol; and logic configured to mathematically combine said first symbol and said second symbol to obtain a second prime symbol.

24. The medium as defined in claim 19, wherein noise energy present in at least one symbol of said block of n-symbol combinations is spread among each symbol of said block of multiple symbols such that the energy of the noise is reduced on each symbol of said block of multiple symbols.

25. The medium as defined in claim 21, wherein said second logic, further comprises:

logic configured to mathematically combine a first prime symbol and a second prime symbol to obtain a first symbol; and logic configured to mathematically combine said first prime symbol and said second prime symbol to obtain a second symbol.

26. The medium as defined in claim 21, further comprising logic configured to re-interleave said block of n-symbol combinations in order to generate error signals used to update adaptive algorithms.

27. The medium as defined claim 19, further comprising logic configured to form said n-symbol combinations into a block.

28. A system for noise suppression, the system comprising:

first means, located in a transmitter of a communications device, for combining a block of multiple symbols from a signaling constellation into a block of n-symbol combinations, wherein said block of n-symbol combinations includes n-input symbols per block and n-output symbols per block, and wherein each of said n-output symbols contains a weighted sample of all of said n-input symbols; and transmitter means for transmitting said n-symbol combinations to a receiver.

29. The system as defined in claim 28, further comprising:

receiver means for receiving a transmitted signal; and second means, located in a receiver of a communications device, for combining said block of n-symbol combinations in order to recover said block of multiple symbols.

30. The system as defined in claim 28, wherein said block of multiple symbols are transmitted sequentially.

31. The system as defined in claim 28, further comprising means for attenuating said block of multiple symbols by an attenuation factor.

32. The system as defined in claim 28, wherein said first means further includes means for mathematically combining a first symbol and a second symbol.

33. The system as defined in claim 28, wherein noise energy present in at least one of said block of n-symbol combinations is spread among each symbol of said block of multiple symbols such that the energy of the noise is reduced on each symbol of said block of multiple symbols.

34. The system as defined in claim 29, wherein said second means further includes means for mathematically combining a first symbol and a second symbol.

35. The system as defined in claim 29, wherein said second means further includes means for re-interleaving said block of n-symbol combinations in order to generate error signals used to update adaptive algorithms.

36. The system as defined in claim 28, wherein said n-symbol combinations define a block.

* * * * *